(12) United States Patent
Kim

(10) Patent No.: US 8,373,793 B2
(45) Date of Patent: Feb. 12, 2013

(54) AUTO FOCUSING METHOD USING VCM ACTUATOR

(75) Inventor: Changhyun Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 337 days.

(21) Appl. No.: 12/878,652

(22) Filed: Sep. 9, 2010

(65) Prior Publication Data

US 2011/0058093 A1  Mar. 10, 2011

(30) Foreign Application Priority Data

Sep. 9, 2009  (KR) .......................... 10-2009-0084790

(51) Int. Cl.
*H04N 5/232* (2006.01)
*G03B 13/00* (2006.01)

(52) U.S. Cl. ........................................................ 348/345

(58) Field of Classification Search .................. 348/345, 348/351, 357
See application file for complete search history.

(56) References Cited

U.S. PATENT DOCUMENTS

| | | | |
|---|---|---|---|
| 6,414,931 B1 * | 7/2002 | Maeda et al. | 369/112.24 |
| 8,174,608 B2 * | 5/2012 | Hara et al. | 348/357 |
| 8,189,093 B2 * | 5/2012 | Tanimura et al. | 348/357 |
| 8,264,591 B2 * | 9/2012 | Yeo et al. | 348/345 |
| 2007/0177860 A1 * | 8/2007 | Hooley et al. | 396/79 |
| 2008/0278030 A1 * | 11/2008 | Hara et al. | 310/307 |
| 2008/0278590 A1 * | 11/2008 | Tanimura et al. | 348/208.99 |
| 2012/0206615 A1 * | 8/2012 | Tanimura et al. | 348/208.99 |

* cited by examiner

*Primary Examiner* — Nicholas Giles
(74) *Attorney, Agent, or Firm* — Saliwanchik, Lloyd & Eisenschenk

(57) ABSTRACT

The present disclosure relates to an auto focusing method using a VCM (voice coil motor) actuator, the method of using the VCM actuator to upwardly move a lens position, to obtain a most-focused upward position value, and downwardly move the lens position to automatically adjust the lens focus, the method comprising: obtaining an auto focus (AF) upward position value, which is an upward position value of a lens when the lens is most focused by upwardly moving the lens to capture an image; determining whether a difference between the AF upward position value and an AF downward position value of a code value which is a bit value corresponding to the AF upward position value is smaller than a pre-set level; and implementing the auto focusing the code value if the difference is smaller than the pre-set level, and using a hysteresis table of the VCM actuator to select a code value corresponding to a downward position value most approximate to the AF upward position value in a downward position value column and to implement the auto focusing adjustment using the corrected code value, if the difference is not smaller than the pre-set level.

5 Claims, 3 Drawing Sheets

AUTO FOCUSING METHOD USING VCM ACTUATOR

CROSS-REFERENCE TO RELATED APPLICATION

This application claims the benefit under 35 U.S.C. §119 of Korean Application Number 10-2009-0084790, filed Sep. 9, 2009, which is hereby incorporated by reference in its entirety.

BACKGROUND

The present disclosure relates to an auto focusing method using a VCM Voice Coil Motor) actuator in a camera or a camera module.

It is recently essential for a camera or a camera module to be mounted with an auto focusing function.

The auto focusing control function is to detect a harmonic component of an image obtained from an image sensor to obtain a focus value (FV) useful to the focus adjustment, and to move a lens to a point where the FV is a maximum value. The method may include a part that detects the FV, a part that determines a moving position of the lens by evaluating the FV, and a part that controls the lens.

Normally, a hill-climbing search algorithm is used to find this maximum focus value. Information on focus control is obtained from an image signal obtained without any separate devices.

A voice coil motor (VCM) is an actuator that uses Lorentz force generated by electromagnetic force of a coil in a magnetic field of a permanent magnet to linearly move a lens. The VCM is adequate to build a system configured to linearly and accurately move a lens in a relatively short distance. That is the VCM has advantages in terms of a short response time suitable for translation motion, a relatively long stroke suitable for miniaturization, and high-precision position control. However, several parameters such as the lens weight, lens size and lens inertia cause a time delay in the lens movement to a desired target position. In particular, hysteresis characteristics of the voice-coil motor and lens inertia cause a generation of different focus values under identical conditions.

That is, in a case an auto focusing (AF) algorithm is implemented using the VCM actuator, hysteresis characteristics of the voice-coil motor are generated in which different focus values under identical conditions are caused, and an upward position value and a downward position value of VCM are differentiated when auto focusing command is received due to structural characteristics of VCM.

To be more specific, the VCM also suffers from disadvantages in that it can hardly expect its optimal control performance with the generally used controller, because it has a nonlinear characteristic, a time-varying characteristic in which its dynamic characteristic varies with the passage of time, and a hysteresis characteristic In the AF algorithm, an AF position code value that is accepted as the most optimal is taken by the upward characteristic of the VCM to set up a lens position based on the AF position code value in the downward characteristic. However, the disadvantage is that an accurate AF cannot be implemented due to a difference between the upward position value and the downward position value.

BRIEF SUMMARY

The present disclosure provides an auto focusing method using a VCM actuator which enable rapid and accurate lens focusing through compensation of lens position errors caused by the hysteresis characteristics of a voice-coil motor in which an upward position value and a downward position value are differentiated.

In one general aspect of the present disclosure, there is provided an auto focusing method using a VCM actuator, the method of using the VCM actuator to upwardly move a lens position, to obtain a most-focused upward position value, and downwardly move the lens position to automatically adjust the lens focus, the method comprising: obtaining an auto focus (AF) upward position value, which is an upward position value of a lens when the lens is most focused by upwardly moving the lens to capture an image; determining whether a difference between the AF upward position value and an AF downward position value of a code value which is a bit value corresponding to the AF upward position value is smaller than a pre-set level; and implementing the auto focusing the code value if the difference is smaller than the pre-set level, and using a hysteresis table of the VCM actuator to select a code value corresponding to a downward position value most approximate to the AF upward position value in a downward position value column and to implement the auto focusing adjustment using the corrected code value, if the difference is not smaller than the pre-set level.

DETAILED DESCRIPTION

Figure 1:
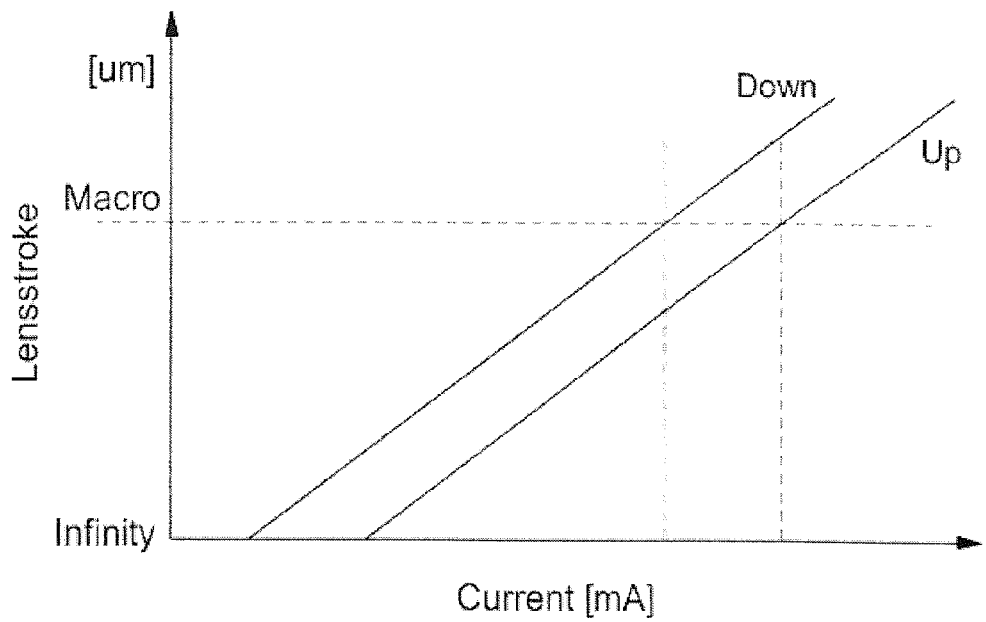
FIG. 1 is a graph illustrating a VCM actuator characteristic.

While certain embodiments, features, attributes and advantages of the present disclosure have been described and illustrated, it should be understood that many others, as well as different and/or similar embodiments, features, attributes and advantages of the present disclosure, are apparent from the description and illustrations. As such, the embodiments, features, attributes and advantages of the disclosure described and illustrated herein are not exhaustive and it should be understood that such other, similar, as well as different, embodiments, features, attributes and advantages of the present inventions are within the scope of the present inventions.

It will be understood that when an element such as a layer, film, region, or substrate is referred to as being "on" or "under" another element, it can be directly on, or directly connected to the other element, or intervening elements may be present. The "on" or "under" of each element is based on the drawings. Also, "exemplary" is merely meant to mean an example, rather than the best. It will be also understood that when an element is referred to as being "connected" or "coupled" to another element, it can be directly connected or coupled to the other element or intervening elements may be present.

Hereinafter, exemplary embodiments of the present invention are described in detail with reference to the accompanying drawings. The same reference symbols identify the same or corresponding elements in the drawings. For the purposes of clarity and simplicity, detailed descriptions of constructions or processes known in the art may be omitted to avoid obscuring the invention in unnecessary detail.

Figure 2:
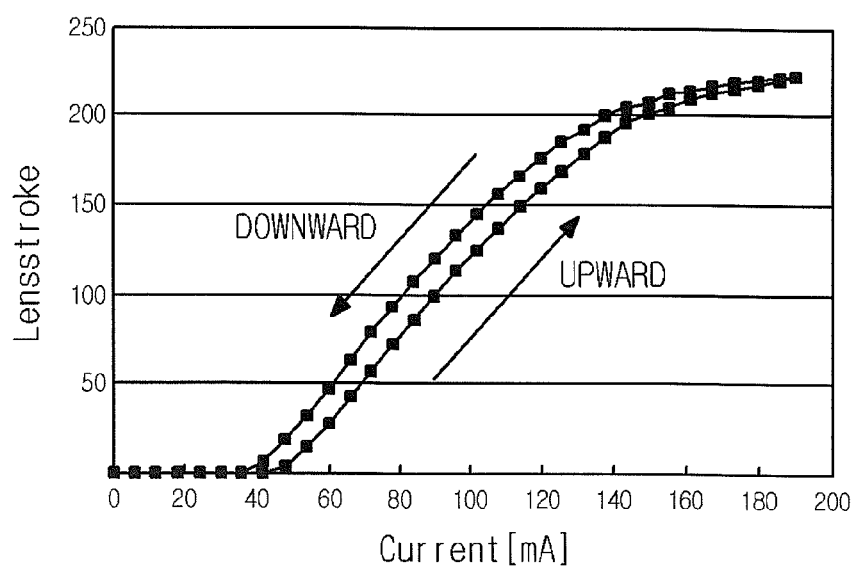
FIG. 2 is a graph illustrating a hysteresis characteristic of a VCM actuator.

FIG. 1 is a graph illustrating a VCM actuator characteristic, and FIG. 2 is a graph illustrating a hysteresis characteristic of a VCM actuator.

Referring to FIGS. 1 and 2, the graph illustrates a lens moving distance responsive to a current value, where it can be noted that an upward location value and a downward position value are different from each other.

At this time, the upward (or up) may define an advancement of a lens while a downward (or down) may define a retreat of a lens. In the AF algorithm, an AF position code value that is accepted as the most optimal is taken by the upward characteristic of the VCM to set up a lens position based on the AF position code value in the downward characteristic. As noted from the drawings, an accurate AF cannot be implemented due to a difference between the upward position value and the downward position value.

The following Table 1 shows an upward position value and a downward position value in a graph illustrating a hysteresis characteristic of a VCM actuator. Referring to Table 1, a code value is a bit value set up in response to a current value, where as the code value is getting smaller, a difference between the upward position value and the downward position value gets greater.

TABLE 1

| code | Upward position value | Downward position value | Difference |
| --- | --- | --- | --- |
| 60 | 27 | 47 | −20 |
| 66 | 42 | 63 | −21 |
| 72 | 57 | 79 | −22 |
| 78 | 72 | 93 | −21 |
| 84 | 86 | 107 | −21 |
| 90 | 100 | 120 | −20 |
| 96 | 113 | 133 | −20 |
| 102 | 125 | 145 | −20 |
| 108 | 137 | 156 | −19 |
| 114 | 149 | 166 | −17 |
| 120 | 160 | 176 | −16 |

Figure 3:
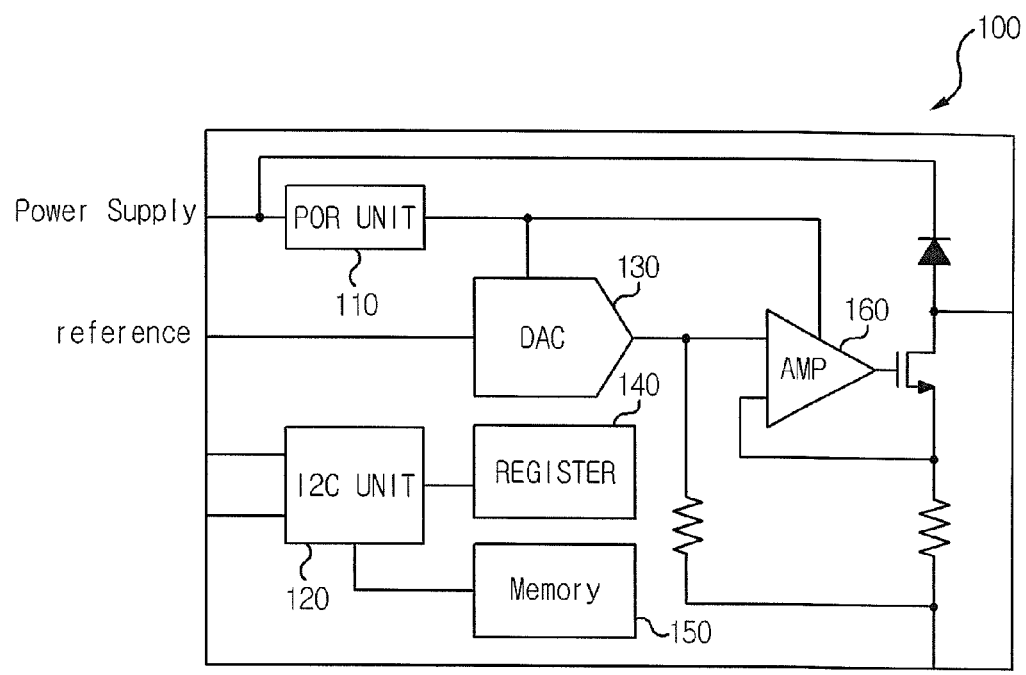
FIG. 3 is a block diagram illustrating a driver of a VCM actuator according to an exemplary embodiment of the present disclosure.

FIG. 3 is a block diagram illustrating a driver of a VCM actuator according to an exemplary embodiment of the present disclosure.

Referring to FIG. 3, a driver of the VCM actuator may include a POR (Power on Reset) unit (110), I2C unit (120), DAC (Digital to Analog Converter) (130), a register (140), a memory (150) and an AMP (Amplifier) (160).

The POR unit (110) drives an apparatus after a delay for a predetermined period until a stable voltage is supplied during application of an initial power supply. The I2C unit (120) receives a signal of auto focusing AF command algorithm. The DAC (130) receives a digital signal and outputs an analogue signal, where in the present exemplary embodiment, a current is outputted as an analogue signal. The register (140) inputs the digital signal outputted from the I2C unit (120) to the DAC (130), and includes a current table.

The following Table 2 illustrates a current table matching a current value to a code value indicated in a bit value.

TABLE 2

| Current value | Code |
| --- | --- |
| 30 | 60 |
| 33 | 66 |
| 36 | 72 |
| 39 | 78 |
| 42 | 84 |

TABLE 2-continued

| Current value | Code |
| --- | --- |
| 45 | 90 |
| 48 | 96 |
| 51 | 102 |
| 54 | 108 |
| 57 | 114 |
| 60 | 120 |
| 63 | 126 |
| 66 | 132 |
| 69 | 138 |
| 72 | 144 |
| 75 | 150 |
| 78 | 156 |
| 81 | 162 |
| 84 | 168 |
| 87 | 174 |
| 90 | 180 |
| 93 | 186 |
| 95 | 190 |

The memory (150) includes a hysteresis table according to an exemplary embodiment of the present disclosure, where the hysteresis table is a table that shows an upward position value and a downward position value of the VCM actuator according to each code value. The AMP (160) functions as a buffer of gain-booting an output value of the DAC (130).

The following Table 3 is a hysteresis table stored in the memory (150) according to an exemplary embodiment of the present disclosure.

TABLE 3

| code | Upward position value | Downward position value |
| --- | --- | --- |
| 60 | 27 | 47 |
| 66 | 42 | 63 |
| 72 | 57 | 79 |
| 78 | 72 | 93 |
| 84 | 86 | 107 |
| 90 | 100 | 120 |
| 96 | 113 | 133 |
| 102 | 125 | 145 |
| 108 | 137 | 156 |
| 114 | 149 | 166 |
| 120 | 160 | 176 |
| 126 | 169 | 185 |
| 132 | 179 | 192 |
| 138 | 188 | 200 |
| 144 | 196 | 205 |
| 150 | 202 | 208 |
| 156 | 205 | 212 |
| 162 | 209 | 214 |
| 168 | 213 | 216 |
| 174 | 215 | 218 |
| 180 | 218 | 220 |
| 186 | 221 | 221 |
| 190 | 222 | 222 |

Figure 4:
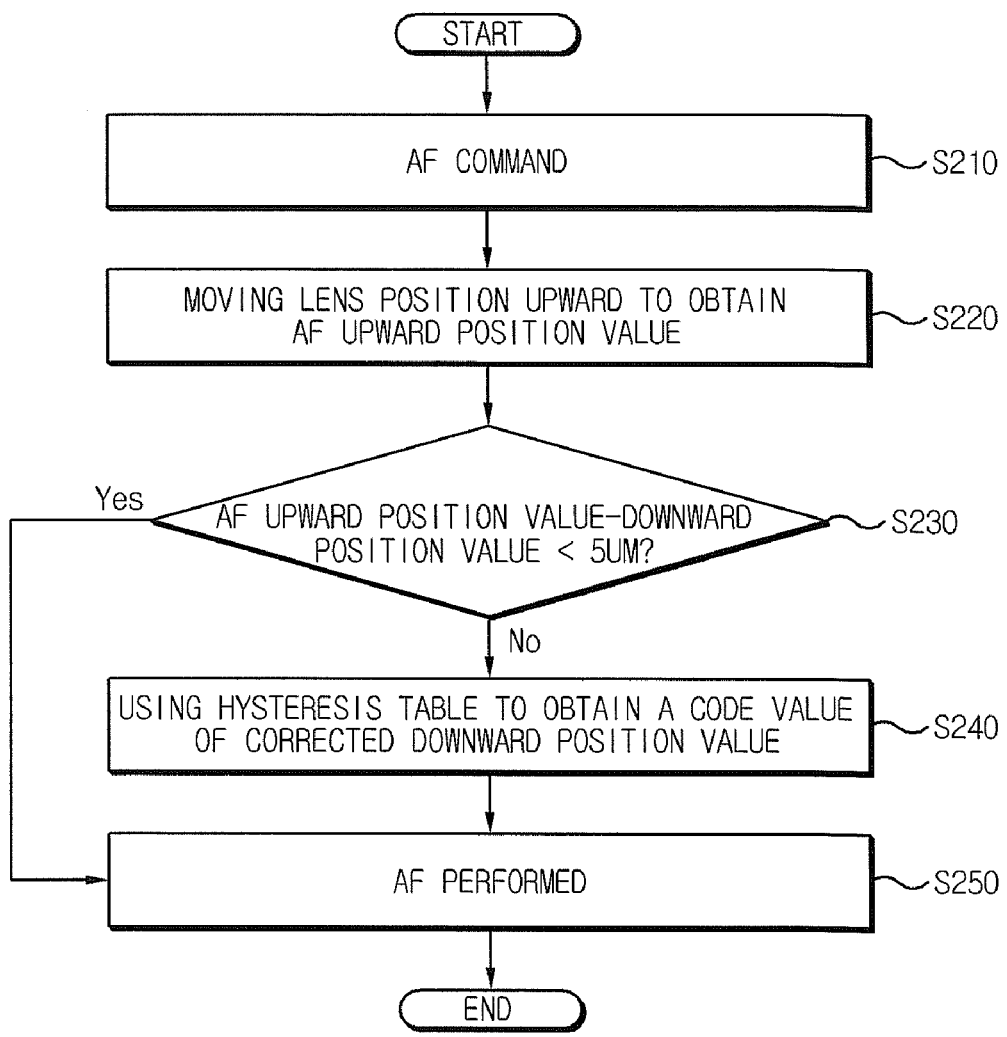
FIG. 4 is a flowchart illustrating an auto focusing method using a VCM according to an exemplary embodiment of the present disclosure.

FIG. 4 is a flowchart illustrating an auto focusing method using a VCM according to an exemplary embodiment of the present disclosure.

Referring to FIG. 4, first of all, an AF command algorithm signal implementing an auto focusing is received (S210). For example, the I2C unit (120) may receive the auto focusing AF command algorithm signal.

Successively, a lens position is upwardly moved to obtain an AF upward position value (S220), where the AF upward position value is an upward position value of a lens when the lens is most focused.

To be more specific, an upward position value is taken according to each code value based on a current table stored in the register (140) to upwardly move the lens position and to capture and store an image, where a most focused upward position value among the stored images is obtained as an AF upward position value. For example, an upward position value of an image having a greatest frequency among the images stored by an ISP (Image Sensor Processor) connected to the driver of the VCM actuator may be obtained as an AF upward position value.

Thereafter, a determination is made as to whether a difference between the AF upward position value and an AF downward position value of a code value which is a bit value corresponding to the AF upward position value is smaller than a pre-set level (S230). At this time, the pre-set level may include various levels. Preferably, the pre-set level may be set up from 5 μm to 10 μm. For example, determination is made as to whether a difference between an AF upward position value and a downward position value of a code value corresponding thereto is smaller than the pre-set level of 5 μm. If the difference is smaller than 5 μm, the AF is performed in the downward position value of a code value corresponding to the AF upward position value (S250).

If the difference is not smaller than 5 μm, the hysteresis table stored in the memory of the driver of the VCM actuator is utilized to obtain a code value corresponding to a downward position value most approximate to the AF upward position value in the downward position value column (S240). If there are two or more code values corresponding to the downward position value most approximate to the AF upward position value, a code value approximate to a code value corresponding to the AF upward position value is selected and obtained. The AF is performed using the corrected code value (S250).

Now, steps of S230 to S250 are explained using examples.

For example, the obtained AF upward position value is 86, and a code value corresponding thereto is 84 according to the Table 3. In the step of S230, a difference between the AF upward position value and a code value corresponding thereto is 21 μm, which is not smaller than the pre-set level of 5 μm.

Therefore, in the step of S240, two downward position values of 79 and 93 which are the most approximate to the AF upward position value of 86 are selected from the downward position value column, using the hysteresis table. Among these two values, 78 which is a code value approximate to a code value corresponding to the AF upward position value, is obtained as the code value. Then, the obtained code value is used to perform the AF.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An auto focusing method using a VCM actuator, the method of using the VCM actuator to upwardly move a lens position, to obtain a most-focused upward position value, and downwardly move the lens position to automatically adjust the lens focus, the method comprising:
    obtaining an auto focus (AF) upward position value, which is an upward position value of a lens when the lens is most focused by upwardly moving the lens to capture an image;
    determining whether a difference between the AF upward position value and an AF downward position value of a code value which is a bit value corresponding to the AF upward position value is smaller than a pre-set level; and
    implementing the auto focusing the code value if the difference is smaller than the pre-set level, and using a hysteresis table of the VCM actuator to select a code value corresponding to a downward position value most approximate to the AF upward position value in a downward position value column and to implement the auto focusing adjustment using the corrected code value, if the difference is not smaller than the pre-set level.

2. The method of claim 1, wherein if there are two or more code values corresponding to the downward position value most approximate to the AF upward position value, a code value approximate to a code value corresponding to the AF upward position value is selected and obtained.

3. The method of claim 1, wherein the AF upward position value is an upward position value when a frequency of the captured image is the highest.

4. The method of claim 1, wherein the upward (or up) is an advancement of a lens, while a downward (or down) is a retreat of a lens.

5. The method of claim 1, wherein the pre-set level is in the range of 5 μm to 10 μm.

* * * * *